US005951621A

United States Patent [19]
Palalau et al.

[11] Patent Number: 5,951,621
[45] Date of Patent: Sep. 14, 1999

[54] PROXIMITY INDICATOR DISPLAY

[75] Inventors: Silviu Palalau, Birmingham; Daniel Toffolo, Dearborn; Marian Borzea, Farmington Hills, all of Mich.; William Rogers, Suffield, Conn.

[73] Assignee: Lear Automotive Dearborn, Inc., Southfield, Mich.

[21] Appl. No.: 08/960,786

[22] Filed: Oct. 30, 1997

[51] Int. Cl.[6] ............................. G08G 11/00; G06F 15/00
[52] U.S. Cl. ...................... 701/200; 701/201; 701/211; 701/212; 340/988; 340/990; 340/995
[58] Field of Search .................................. 701/200, 201, 701/211, 212; 340/988, 990, 995

[56] References Cited

U.S. PATENT DOCUMENTS

| | | | |
|---|---|---|---|
| 5,323,321 | 6/1994 | Smith, Jr. ................................. | 701/211 |
| 5,450,325 | 9/1995 | Rodriguez ................................ | 701/200 |
| 5,757,289 | 5/1998 | Nimura et al. ........................... | 340/995 |

FOREIGN PATENT DOCUMENTS

| | | |
|---|---|---|
| 0767448A1 | 4/1996 | European Pat. Off. . |
| 2298921 | 11/1994 | United Kingdom . |

OTHER PUBLICATIONS

International Search Report dated Feb. 11, 1999 for International Application No. PCT/US98/22359.

Japanese Patent Abstract—European Patent Office—Publication No. 01016916 (Publication Date—Jan. 20, 1989).

Chande P K et al.: "Intelligent Navigator for Automobiles"—Proceedings of the International Conference on Industrial Elecronic Control and Instrumentation, Kobe, Oct. 28–Nov. 1, 1991; vol. 2, No. Conf. 17, Oct. 28, 1991, pp. 1115–1121, XP000313417 –Institute of Electrical and Electronics Engineers; see p. 1118, left–hand column, line 33–line 46; Figure 1B.

*Primary Examiner*—William A. Cuchlinski, Jr.
*Assistant Examiner*—Yonel Beaulieu
*Attorney, Agent, or Firm*—Niro, Scavone, Haller & Niro

[57] ABSTRACT

A display system for use with a route guidance system includes a display displaying a proximity indicator. The proximity indicator generally comprises a bar graph which is reduced in size as the vehicle approaches the next maneuver recommended by the route guidance system. Later, the reduced bar graph changes color and flashes to signal the impending turn.

17 Claims, 2 Drawing Sheets

PROXIMITY INDICATOR DISPLAY

BACKGROUND OF THE INVENTION

The present invention relates generally to a display from use in route guidance for a vehicle navigation system.

Vehicle guidance systems are well known. One or more sensors in a vehicle, such as a global positioning satellite receiver determine the position of the vehicle relative to a road map stored in a database. Route guidance software provides turn-by-turn route guidance information to guide the driver from the current location of the vehicle to a selected destination. For example, a display may instruct the driver to turn right at the next intersection. However, since the driver must also drive the car safely while receiving information from the display in the route guidance system, information must be communicated efficiently to the driver without diverting too much attention from the road.

SUMMARY OF THE INVENTION

The present invention provides a proximity indicator display for use with a route guidance system which communicates route guidance information efficiently and safely. In a preferred embodiment, the proximity indicator display generally comprises a bar graph which is reduced in size proportionally to the distance to be traveled by the vehicle before the next turn recommended by the route guidance system. As the vehicle approaches the intersection where the next maneuver is to take place, the bar graph is reduced in size. Later, the reduced bar graph also changes color and eventually flashes before the indicated turn. Simultaneously, the display displays the exact distance to the maneuver.

In this manner, the distance to the next turn is communicated efficiently and safely to the driver, without having to read the text of the display. The driver can perceive the distance to the impending maneuver graphically.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
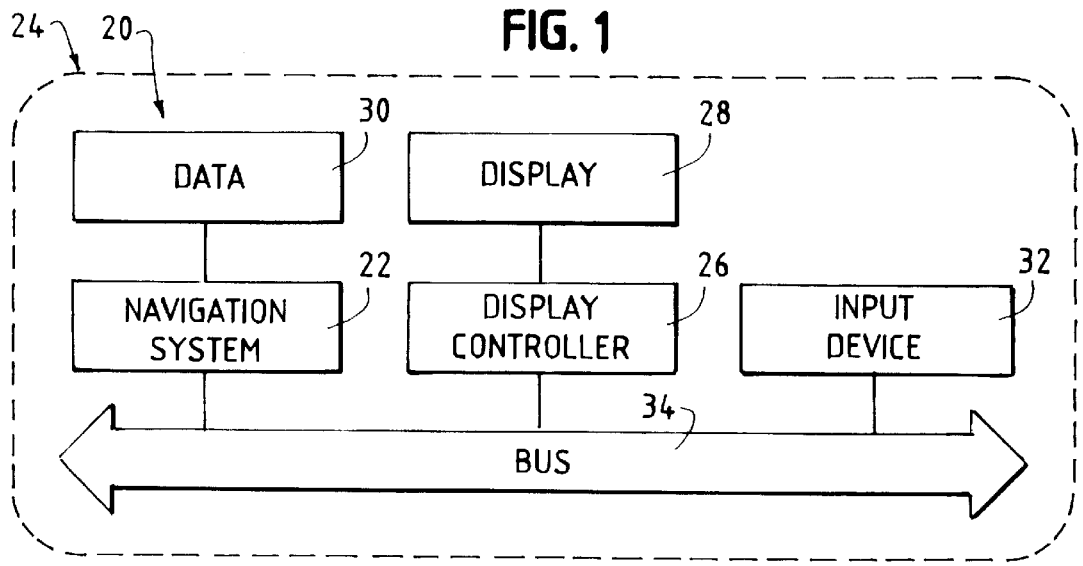
FIG. 1 is a schematic of the display system of the present invention.

The present invention provides a display system 20, particularly for use with a navigation system 22, such as is installed in a vehicle 24. The display system 20 includes a display controller 26 which controls the contents of a display 28 to communicate information to a driver of the vehicle 24. The navigation system 22 may comprise any known positioning and route guidance system. As is well known, the navigation system 22 determines the present location of the vehicle 24 relative to a database 30 of roads to be traveled by the vehicle 24, such as by utilizing known global positioning or dead-reckoning techniques. The navigation system 22 further includes route guidance software operated by a microprocessor which permits the user to select a destination relative to the database of roads 30 by using a user input device 32, such as a mouse, buttons, graphical user interface, etc. and which may be connected to the navigation system 22 via a bus 34, such as the vehicle bus. As is well known, after the user selects a destination relative to the database 30 and the navigation system 22 determines the present location of the vehicle 24 relative to the database 30, the route guidance software in the navigation system 22 calculates a route between the present location and the selected destination. The navigation system 22 continuously displays the updated present location of the vehicle 24 and turn-by-turn instructions on the display 28 guiding the driver of the vehicle 24 along the route selected by the route guidance software in the navigation system 22.

In the present invention, the navigation system 22 sends information to the display controller 26, including the present location of the vehicle 24 relative to the database 30 and information regarding the next maneuver to be performed by the driver of the vehicle 24 to follow the recommended route. Details of the preferred architecture and interaction between the display controller 26 and navigation system 22 are disclosed in co-pending application U.S. Ser. No. 08/920,029 filed Aug. 26, 1997 entitled "Vehicle Display Using Icons," the assignee of which is the assignee of the present invention, and which is hereby incorporated by reference.

Figure 2:
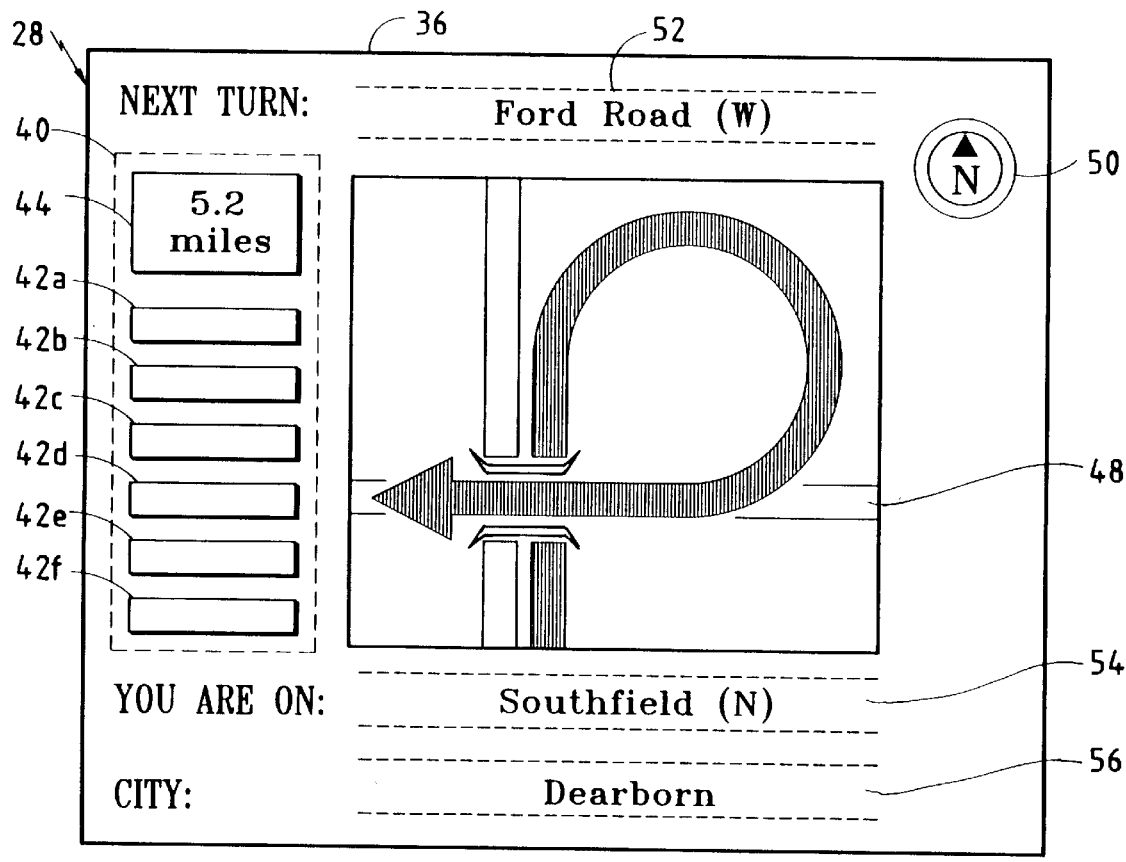
FIG. 2 is the display of FIG. 1 displaying one possible image.

A sample image 36 to be displayed by display 28 is shown in FIG. 2. The image 36 includes a proximity indicator 40 comprising a plurality of bar icons 42a–f and a 20 numerical display 44. The bar icons 42a–f together form a bar graph indicating graphically to the driver of the vehicle 24 the distance to the next maneuver recommended by the navigation system 22. As will be described in more detail with respect to FIGS. 3–6, the bar icons 42a–f are sequentially deleted as the vehicle 24 approaches the next maneuver recommended by the route guidance software in the navigation system 22. Further, as the vehicle 24 approaches the next maneuver, the remaining bar icons 42 and the background of the numerical display 44 change color. Later, the remaining bar icons 42 flash to signal that the next maneuver is imminent. The numerical display 44 continuously displays the distance to the next maneuver in miles or kilometers as may be selected by the user via the user input device 32.

The image 36 further includes an intersection icon 48 indicating the type of intersection at which the next maneuver will occur, i.e. a T-intersection, freeway entrance, freeway exit, etc. The image 36 further includes graphical heading icon 50 which generally indicates the current heading of the vehicle 24. The image 36 further displays text information in a next turn field 52 indicating the name of the road at which the next maneuver occurs. A current road field 54 and a current city field 56 indicating the current location of the vehicle 24 relative to the database 30. The operation of the icons 42, 48, 50 and text fields 52, 54, 56 are described in further detail in the above referenced co-pending application.

Figure 3:
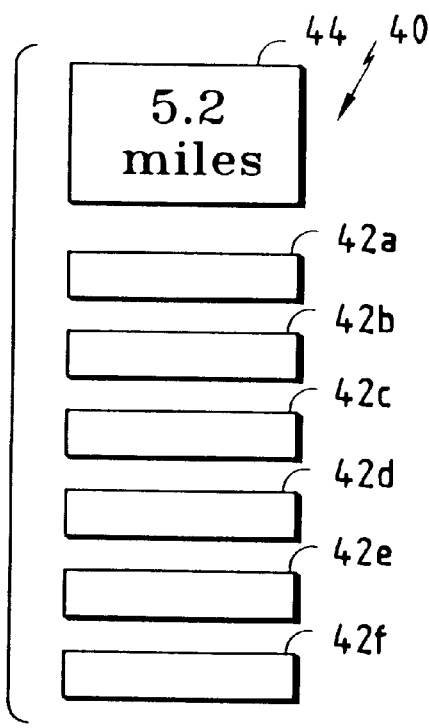
FIG. 3 is the proximity indicator of FIG. 2 in a first state.

The operation of the proximity indicator 40 will be described with respect to FIGS. 3–6. In FIG. 3, the proximity indicator comprises bar icons 42a–f and numerical display 44. The bar icons 42a–f and numerical display 44 are preferably green in color as long as the distance to the next maneuver is greater than two miles.

Figure 4:
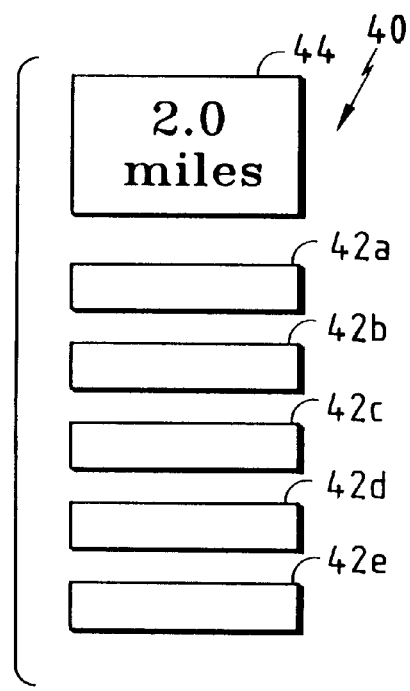
FIG. 4 is the proximity indicator of FIG. 3 in a second state.
Figure 5:
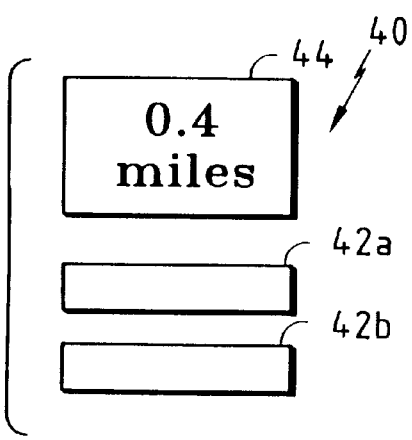
FIG. 5 is the proximity indicator of FIG. 3 in a third state.
Figure 6:
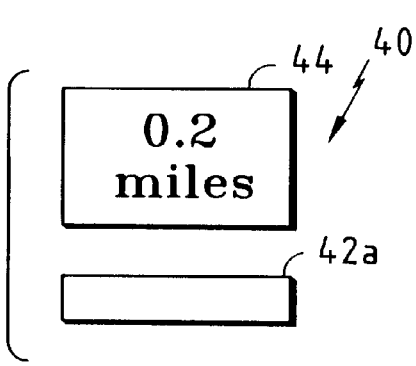
FIG. 6 is the proximity indicator of FIG. 3 in a fourth state.

As can be seen in FIG. 4, when a distance to the next maneuver is reduced to two miles, the bar icon 42f is deleted, thereby reducing the size and area of the proximity indicator 40. As the distance to the next maneuver drops below two miles, the remaining bar icons 42 and the background of the numerical display 44 preferably turn orange in color. Further, bar icons 42c–e are sequentially deleted as the distance to the next maneuver approaches 0.4 miles, as is shown in FIG. 5. When the distance to the next maneuver reaches 0.4 miles, the proximity indicator 40 comprises bar icons 42a–b and numerical display 44, which again are preferably orange in color.

As the distance to the next maneuver reaches 0.2 miles, bar icon 42b is deleted and bar icon 42a and the background of numerical display 44 turn red in color. Finally, when the distance to the next maneuver reaches 0.1 miles or less, the bar icon 42a begins to flash. The numerical display 44 continuously displays the numerical distance to the next maneuver. When the maneuver is performed, the proximity indicator 40 is reset based upon the distance to the next maneuver. It should be recognized that the distance to the next maneuver may be short initially and that therefore, the proximity indicator 40 may start out in one of the states shown in FIG. 4 or 5 or 6.

The proximity indicator 40 of the present invention graphically displays the distance to the next maneuver to the driver of a vehicle 24 having a navigation system 22 with route guidance software. The proximity indicator 40 communicates the imminence of the next maneuver to the driver of the vehicle 24 efficiently and safely. The driver need not read the numerical display 44, but can perceive the distance to the next maneuver quickly. The driver may perceive the reduction and size of the proximity indicator 40, as well as the changing color without necessarily directly focusing on the display 28, but perceiving it within his field of view. As a result, the proximity indicator 40 may provide a safer, more efficient means of communicating the distance to the next maneuver to the driver of the vehicle 24.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle display system comprising:
   a controller receiving a maneuver instruction indicating a maneuver to be performed by a driver of the vehicle, said controller receiving a distance to be travelled before the maneuver is performed;
   a display including a proximity indicator indicating the distance to be travelled before performing the maneuver, said controller altering said proximity indicator using a plurality of modes based upon a reduction in the distance to be travelled before performing the maneuver, the plurality of modes including a first mode where a color of the proximity indicator is changed, a second mode where a size of the proximity indicator is changed and a third mode where the proximity indicator flashes.

2. The system of claim 1, wherein said proximity indicator includes a plurality of icons and wherein the second mode includes sequentially deleting selected ones of the plurality of icons as the distance to the maneuver decreases.

3. The system of claim 1, wherein the display includes a graphical representation of the maneuver to be performed.

4. The system of claim 3, wherein the graphical representation of the maneuver includes an indication of the type of intersection at which the maneuver is to be performed.

5. The system of claim 3, wherein the graphical illustration of the maneuver is displayed separate from the proximity indicator.

6. The system of claim 1, wherein the controller alters the proximity indicator using the first mode followed by the second mode followed by the third mode, respectively, as the distance to the maneuver decreases.

7. The system of claim 1, wherein said proximity indicator includes a bar graph and a numerical display indicating the distance to the maneuver and wherein the controller alters the numerical display to continuously indicate the distance to the maneuver as the distance decreases.

8. A method of displaying a distance to be travelled, comprising the steps of:
   (A) receiving a maneuver instruction and indicating a maneuver to be performed at a predetermined location;
   (B) receiving a distance to be travelled before the predetermined location is encountered where the maneuver is to be performed;
   (C) displaying a proximity indicator indicating the distance to be travelled before encountering the predetermined location;
   (D) altering the proximity indicator using a first mode when a distance between a current location and the predetermined location is within a first range;
   (E) altering the proximity indicator using a second mode when the distance between the current location and the predetermined location is within a second range; and
   (F) altering the proximity indicator using a third mode when the distance between the current location and the predetermined location is within a third range.

9. The method of claim 8, wherein steps (D), (E) and (F) are performed sequentially.

10. The method of claim 8, wherein step (D) includes changing a color of the proximity indicator.

11. The method of claim 8, wherein step (E) includes reducing an area of the proximity indicator.

12. The method of claim 11, wherein the proximity indicator includes a plurality of icons and the second mode includes sequentially deleting selected ones of the icons as the distance between the current location and the predetermined location decreases.

13. The method of claim 12, wherein the proximity indicator includes a bar graph.

14. The method of claim 8, wherein step (F) includes flashing at least a portion of the proximity indicator.

15. The method of claim 8, including displaying a graphical representation of the maneuver to be performed separate from the proximity indicator.

16. The method of claim 15, including displaying a graphical representation of a road surface at the predetermined location where the maneuver is to be performed.

17. The method of claim 8, wherein the first range of step (D) is greater than the second range of step (E), which is greater than the third range of step (F).

* * * * *